United States Patent [19]

Aubry

[11] Patent Number: 5,067,632
[45] Date of Patent: Nov. 26, 1991

[54] DEVICE FOR THE INDIVIDUAL FEEDING OF STUDS OR BOLTS

[75] Inventor: Friedhelm Aubry, Velbert, Fed. Rep. of Germany

[73] Assignee: TRW Nelson BolzenschweiB-Technik GmbH & Co. KG, Gevelsburg, Fed. Rep. of Germany

[21] Appl. No.: 549,217

[22] Filed: Jul. 6, 1990

[30] Foreign Application Priority Data

Jul. 7, 1989 [DE] Fed. Rep. of Germany ....... 3922439

[51] Int. Cl.$^5$ ............................................. G07F 11/24
[52] U.S. Cl. .................................... 221/266; 221/268; 221/277
[58] Field of Search ............... 221/266, 278, 263, 257, 221/261, 264, 265, 268, 273, 277

[56] References Cited

U.S. PATENT DOCUMENTS

| 2,743,001 | 4/1956 | Nordquist | 221/266 X |
| 3,275,191 | 9/1966 | MacDonald | 221/264 X |
| 3,294,285 | 12/1966 | Kovacevie | 221/277 X |
| 4,173,211 | 11/1979 | Crawford, Jr. | 221/266 X |
| 4,694,974 | 9/1987 | Heck et al. | 221/263 |

FOREIGN PATENT DOCUMENTS

| 519941 | 11/1953 | Belgium . |
| 1930151 | 12/1977 | Fed. Rep. of Germany . |
| 1921025 | 11/1978 | Fed. Rep. of Germany . |
| 3108846 | 2/1982 | Fed. Rep. of Germany . |
| 8607260 | 6/1986 | Fed. Rep. of Germany . |
| 3624326 | 1/1988 | Fed. Rep. of Germany . |
| 419964 | 3/1967 | Switzerland . |
| 8315512 | 5/1981 | U.S.S.R. . |

Primary Examiner—Robert P. Olszewski
Assistant Examiner—Dean A. Reichard
Attorney, Agent, or Firm—Allen D. Gutchess, Jr.

[57] ABSTRACT

The invention relates to a device for the individual feeding of studs or bolts 2 or pins 2', arranged one after the other between guide rails 1, to at least one bolt outlet, 3, 4, blasted with blowing air, and leading to a bolt-welding device. According to the invention, a rotor 5 is provided with at least two outlet slots 6, 7, for each bolt 2, this rotor 5 being arranged rotatably alternately between guide rails 1 and one or at least two bolt-welding devices or the bolt outlets 3, 4.

16 Claims, 5 Drawing Sheets

DEVICE FOR THE INDIVIDUAL FEEDING OF STUDS OR BOLTS

BACKGROUND OF THE INVENTION

The invention relates to a device for the individual feeding of studs, bolts, or pins arranged one after the other between guide rails, to at least one bolt outlet, blasted with blowing air, leading to a bolt-welding device.

Already known in the art as a device for the conduction of bolts, is the use of a pusher, moving back and forth as seen in German Patent 1,921,025; German Published Application 1,930,151; German Disclosure 3,624,326; and German Utility Model 8,607,260. Here, the individual devices are so shaped that a drum storage is connected before the pusher and the guide rails, through which the pre-isolated bolts are fed over the guide rails to the pusher. This pusher is correspondingly controlled, and allows a single bolt to be carried each time, on blowing air through a line to a bolt-welding device. Through the back and forth motion of the pusher, a considerable limitation is given in the speed of the feeding of the individual bolts to the bolt-welding device. It also was not possible, for example, to load two different bolt-welding devices in succession, with bolts, within a short time.

Also known in the art is a sorting device for bolts to be welded, which again includes a straight line conduction, fast with the frame, and a pusher, limited in length, with adjustable support as shown in German Utility Model 8,607,260. A device for feeding bolts to a bolt-welding device, in which external bolt holders are assigned to one bolt-welding device, which, according to a selectable call-out program scheme, can be connected alternately with the bolt-welding device is also known in the art in German Patent 3,108,846. This is an expensive construction requiring an exact control unit in order that the selectable program will operate correctly.

SUMMARY OF THE INVENTION

The present invention attacks the problem of designing a device of the kind mentioned, so that in a simple but reliable way, at least two bolt-welding devices can be fed with bolts in succession.

This problem is solved, in accordance with the invention, by an alternately rotating or oscillating rotor with at least two receiving slots or notches for one bolt in each case, arranged between the guide rails and at least two bolt outlets leading to the bolt-welding device. By the use of a rotor of alternate rotation, two closely spaced bolt-welding devices, can be fed with bolts. The rotor feeds the one bolt-welding with the corresponding bolt, at the same time the second bolt-welding slot is fed, through the guide rails, with a new bolt, while this latter can then be fed to the second bolt-welding device. The two receiving slots arranged in the rotor thus allow a simultaneous receiving and giving up of two bolts.

In a further embodiment of the invention, the axis of rotation of the rotor and the lengthwise axis of the bolts run parallel, so that a simple construction is given.

As to the design of the rotor, it is possible, according to another feature of the invention, to design this latter as a cam, while on its outer circumference two receiving slots are arranged. As an alternative, it is also possible for the rotor to be in the form of a Maltese cross and to have four receiving slots on its outer circumference. Instead of the Maltese cross, the rotor may also have a cylindrical shape and, again, be provided with receiving slots on its outer circumference, while, by a simple repositioning of the rotor by 180°, two other receiving slots may be used when the first receiving slots are worn out and no longer have any exact dimensioning.

According to another feature of the invention, the rotor may be arranged in housing and connected below with a swinging drive. In this case, the housing may have in each case, on opposite sides, a connection for blowing air and on the upper side, in each case, a bolt outlet connected with the air blowing connection, so that a compact, space-saving construction is given.

To be able to carry out easily the above-mentioned repositioning of the rotor, in case of wear on the receiving slots, in a further embodiment of the invention, between the axis of rotation of the rotor and an axis of the swinging drive, designed pnuematically, for example, may be arranged a plug and coupling, for example, in the form of a wedge connection. For this purpose, the rotor may be fastened, repositioned on this axis of the swinging drive, and may have mounting openings for pulling out or turning. These mounting openings may be designed, for example, in each case as blind holes.

As to the design of the receiving openings, it is possible, in a further development of the invention, to give the receiving slots the same or a different dimensioning. With different dimensioning of the receiving slots, it is possible to advance bolts of the greatest variety of shape with the same rotor, from the guide rails to the bolt outlets. Here, the receiving slots might pass all the way through, for example.

To be able to transport bolts of different height or length through the rotor of the invention, it is also possible, according to another feature of the invention, to place a stop, which can be stopped, in the receiving slot, through which the depth of the receiving slot can be defined to correspond to the bolt to be carried.

As an alternative, it is possible to design the receiving slot in each case as a blind hole, with a bottom, so that the use of the stop can be eliminated.

The invention is described in detail below from examples of execution represented in the drawings.

DETAILED DESCRIPTION OF THE INVENTION

Figure 1:
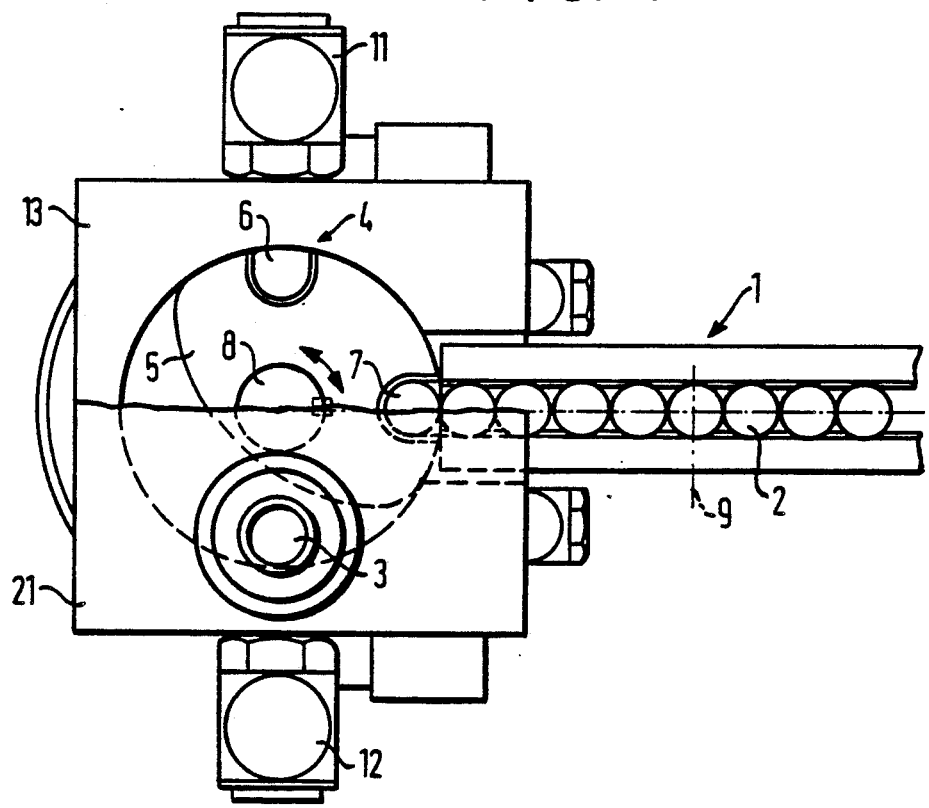
FIG. 1 is a top view of one embodiment of the device for feeding bolts, partly cut away.

According to FIG. 1, guide rails 1 are provided, between which bolts or studs 2 are arranged one after another, from a magazine, not shown in detail, to a device which feeds bolts 2 to two bolt-welding devices. This device for the individual feeding of the bolts consists mainly of a rotor 5, in the form of a cam, which is rotatable around an axis of rotation 8, in the direction of the arrows. The axis of rotation 8 of the rotor 5 and the lengthwise axis 9 of the bolts lie parallel in this instance.

The cam-shaped rotor 5 has on its outer circumference two receiving slots or notches 6 and 7, at an angle of 90° from each other. The rotor 5 is arranged in a housing 13, which has on the opposite sides, in each case, a connection, 11 and 12, respectively, for blowing air, and on the upper side, in each case, a bolt outlet 3 and 4, connected with the air blowing connections 11, 12. Since FIG. 1 is a section, only the bolt outlet 3 can be seen.

Figure 2:
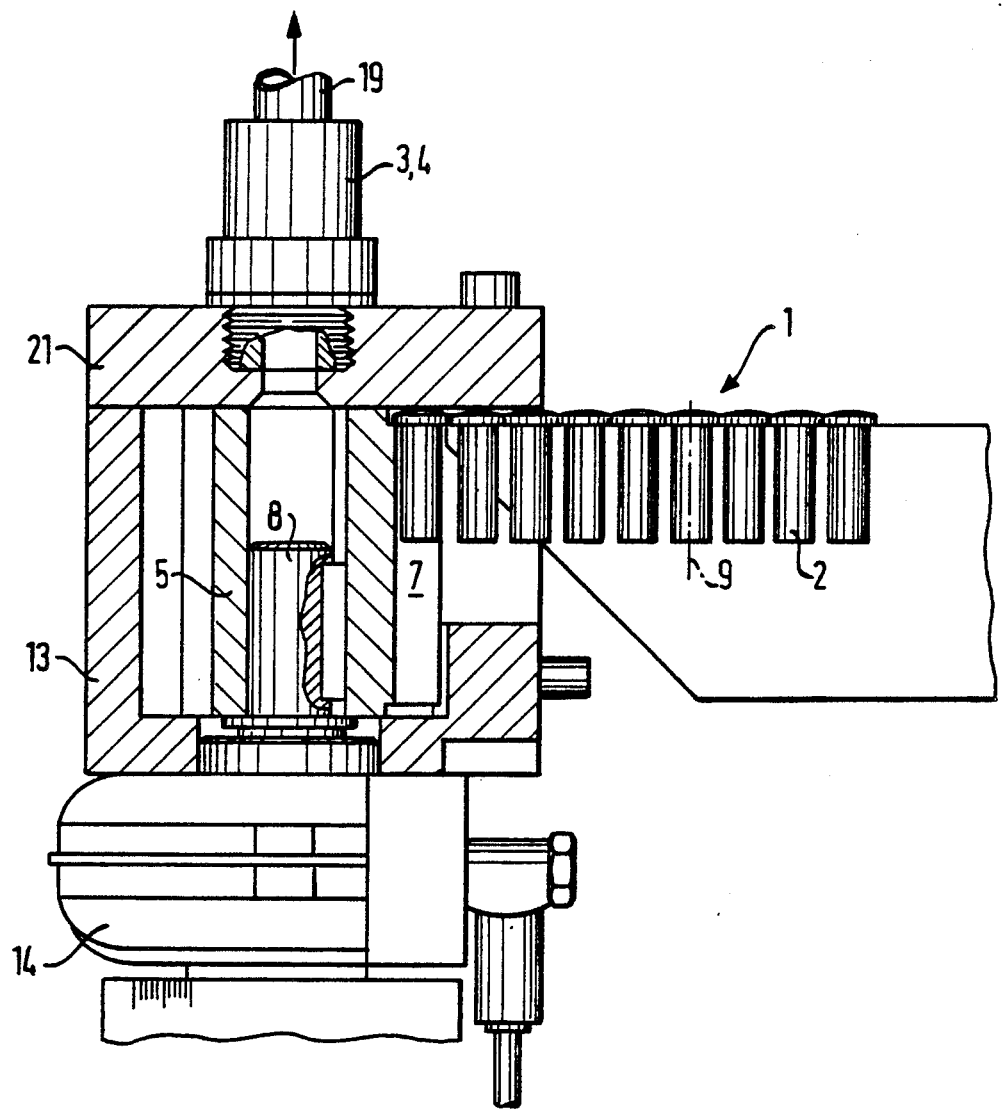
FIG. 2 is a cross section of the embodiment shown in FIG. 1.

According to FIG. 2, the axis of rotation 8 of the rotor 5 is joined, through a wedge connection with a drive shaft of a swinging or oscillating drive 14, preferably pneumatic. Through this drive, the rotor 5, as mentioned above, is oscillated in the directions of the arrows. In the position shown in FIG. 1, the receiving slot 7 is filled with a new bolt, while the receiving slot 6 lies coincident with the bolt outlet 4, and here, with the aid of the air entering through the connection 11, according to FIG. 2, the bolt is carried over the line 9 to the corresponding bolt-welding device. Now the rotor 5 may be turned clockwise by 90°, so that the empty receiving slot 6 lies coincident with the bolt between the guide rails 1, and the receiving slot 7, filled with a new bolt 2 is beneath the bolt outlet 3, so that this bolt, through blowing air, can be carried over a corresponding line, in the appropriate direction, to another bolt-welding device.

From FIG. 2 it can be seen that the receiving slots 6 and 7 extend over the whole length on the outer circumference of the cam-rotor. Thus, both short and long bolts can be fed to the particular bolt-welding device.

Figure 3:
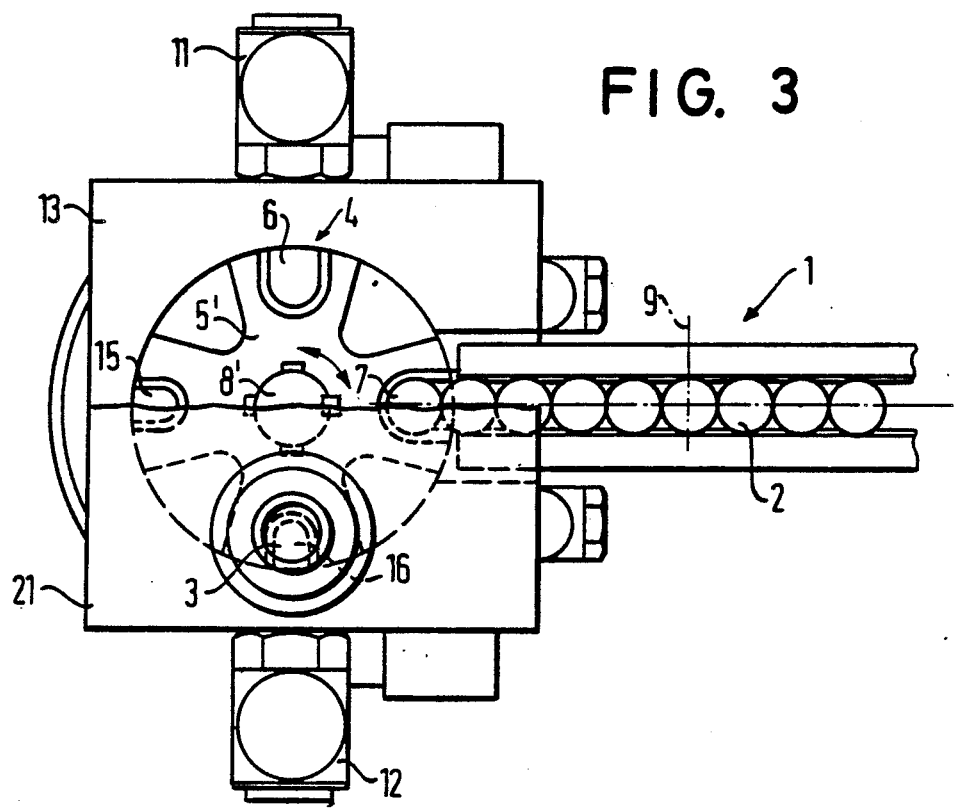
FIGS. 3 and 4 show two modified embodiments of the shape of the rotor, in top view, in each case, partly cut away.

According to FIG. 3, the rotor 5' may be made in the form of a Maltese cross, while four receiving slots 6, 7, 15 and 16, may be arranged on its outer circumference. With this form of design, the axis of rotation 8' of the rotor is a keyed shaft. If the receiving slots 6 and 7 become worn by carrying the corresponding bolts 2 over a long period of time, then, with this form of construction, the rotor 5' may be turned by 180° on the axis of rotation 8', so that now the receiving slots 15 and 16 perform the previous function of the receiving slots 6 and 7. Thus, advantageously, the rotor 5', with this form, may be used over a longer period of time, while requiring little maintenance; in case of wear, it is made functional again by simple turning of the rotor 5'.

Figure 4:
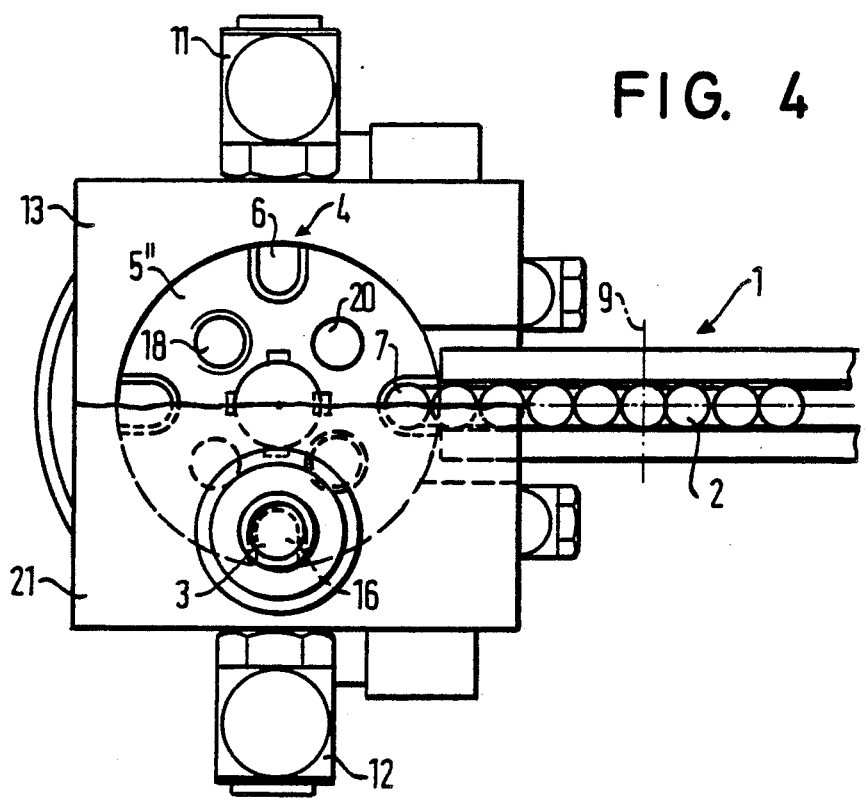

In the form of execution according to FIG. 4, the rotor 5" is designed as a cylindrical element, and has on its outer circumference, the four receiving slots 6, 7, 15 and 16, in each case displaced by 90°. Here again, the rotor shaft 8' is designed as a keyed shaft so that, as in the form of FIG. 3, by simply turning the rotor 5", instead of the receiving slots 6 and 7, the slots 15 and 16 are now ready to carry out the transport function.

Figure 5:
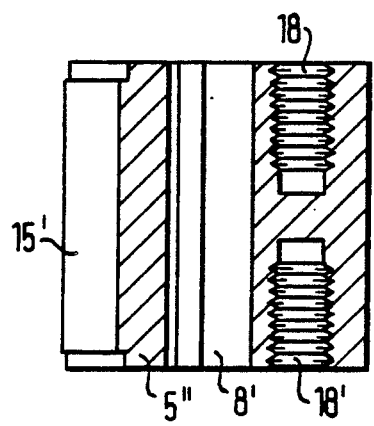
FIG. 5 is a view in section along the line V—V of a rotor shape according to FIG. 6.
Figure 6:
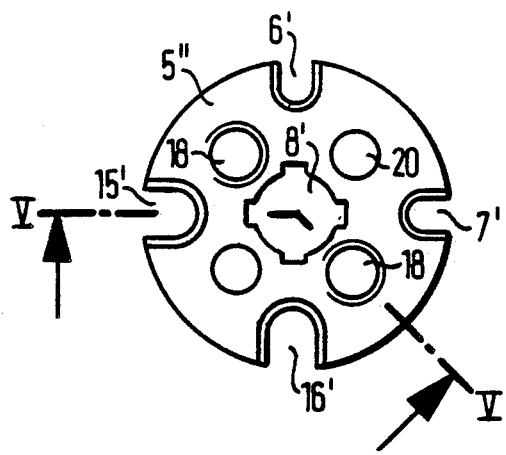
FIG. 6 is a top view of the rotor of FIG. 5.

FIGS. 5 and 6 represent a rotor 5", similar to the form of FIG. 4, in section V and in top view. Again, the receiving slots in FIG. 5 extend over the whole length of the rotor 5". With this form, it is possible to carry four bolts of different diameter, while, as in the forms according to FIGS. 1 to 4, two bolts of different diameter are carried through the receiving slots 6' and 7', and by turning as in the previous forms, on the rotor shaft 8', in case of other bolt diameters, the receiving slots 15' and 16' come into action, and thus bolts of different dimensions are carried.

According to FIGS. 5 and 6, in this form of the rotor 5", the two receiving slots 6' and 7' are of the same size, as are the slots 15' and 16'. Thus, by simple turning, two kinds of bolts of different diameters, may be carried.

It is possible, however, as explained above, that all the receiving slots, 6', 7', 15' and 16', may have different dimensions, so that the bolts carried over the guide rails 1, presorted as to their dimensions, are fed into the several receiving slots.

To simplify the turning or repositioning of the rotor 5", assembly openings 18 and 18' are provided, each designed as a threaded blind hole. By screwing in a screw, the operator can lift out the rotor 5" on the rotor shaft 8', and displace it by 180°, so that no longer the receiving slots 6' and 7', but now the receiving slots 15' and 16' lie in the zone of the bolt outlets 3 and 4 and the guide rails 1. Other passage openings 20 may be provided beside these assembly openings.

Figure 7:
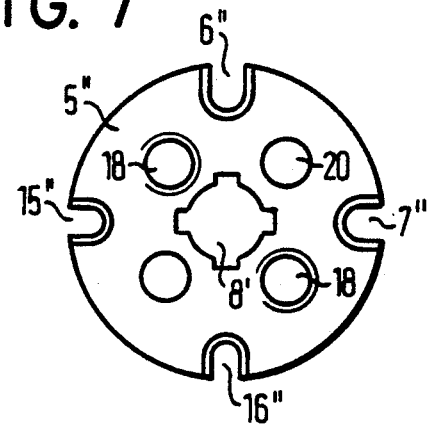
FIG. 7 is a view in direction X of FIG. 8 of another design of the rotor.
Figure 8:
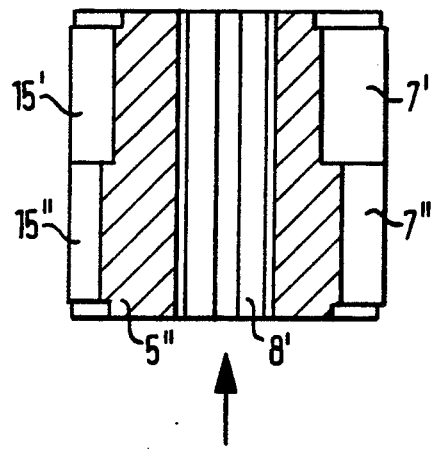
FIG. 8 is a section through a rotor with differently dimensioned receiving slots.
Figure 9:
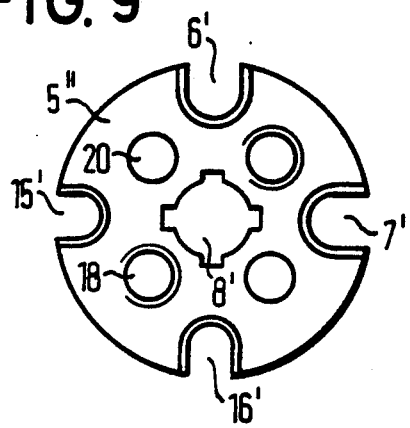
FIG. 9 is a view in direction Y of FIG. 8 of the design.

FIGS. 7, 8 and 9 show another form of the rotor 5". Here, it can be seen from FIGS. 8 and 9 that the rotor 5" has in the upper zone differently dimensioned receiving slots 6", 7" or 15" and 16". With this, up to eight different bolt diameters may be taken, with the aid of a single rotor 5", from the guide rails 1, and carried to the corresponding bolt outlet 3 and 4, as in the design according to FIGS. 1 and 2. Again, the rotor 5" has a profiled rotor shaft 8', and assembly openings 18 in the form of threaded blind holes.

Figure 10:
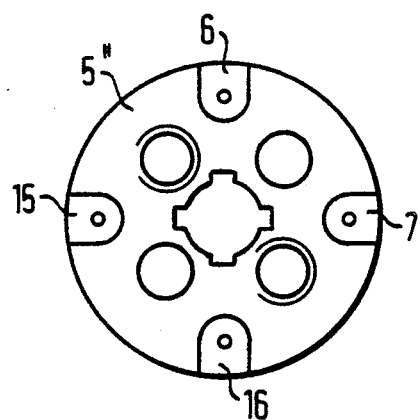
FIG. 10 is a top view on another embodiment of the rotor.
Figure 10:
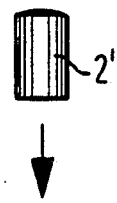
Figure 11:
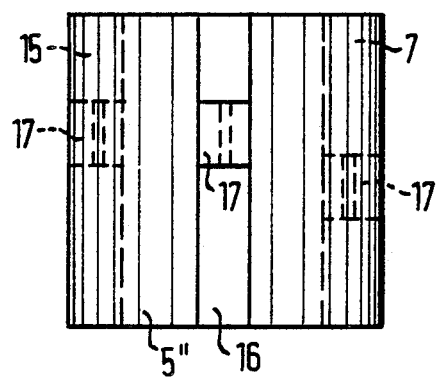
FIG. 11 is a side view of the rotor according to FIG. 10.
Figure 12:
FIG. 12 is a side view and top view of a stop set into a receiving slot of the rotor of FIG. 11.
Figure 12:

In the form of the rotor 5" according to FIGS. 10 and 11, the receiving slots 6 and 7 or 15 and 16, are designed again as continuous, similar to the form in FIGS. 1 and 2. To carry, for example, bolts or studs 2', of different lengths, with a single rotor 5", it is possible to place a suitably shaped stop 17, according to FIG. 12, within the receiving slots 6, 7 or 15,16, according to the length of the pins carried. Since the stops are adjustable in height, it is possible to carry in a simple way, pins of different length, these pins 2', as in FIG. 11, being designed without flanges.

From FIG. 11 it can be seen that the stops 17, in the slots 15 and 16 are arranged at a different height in these slots than the stops 17 in the receiving slot 7. With this, longer pins can be carried in the receiving slots 6 and 7, while it is possible, again, by simple repositioning of the rotor, with the use of receiving slots 15 and 16, to carry shorter pins from the guide rails to the bolt-welding device.

The respective rotors 5 or 5' or 5" are arranged in the housing 13 so that, through the use of air blown through the air-blowing connections 11 and 12, a loss of energy is provided, so far as possible, and thus the bolts and/or pins lying in the zone of the bolt outlets 3 and 4 are carried economically to the respective bolt-welding devices.

This housing 13 is closed, according to FIGS. 1 to 4, by a cover 21 in the upper zone, this cover 21 bearing the bolt outlets 3 and 4.

Through the special design of the rotor, provided in each case with at least two receiving slots, there is given an especially effective advancing of the particular bolt or studs 2 or 2', through the corresponding receiving slots into the bolt outlets 3 and 4.

I claim:

1. Device for the individual feeding of bolts, or the like, arranged one after another between guide rails, to at least two bolt outlets, blasted with air, leading to at least two bolt-welding devices, with a rotor arranged between said guide rails and the bolt outlets leading to said bolt-welding devices, with at least two receiving slots for receiving one bolt, said receiving slots being designed as blind holes.

2. Device according to claim 1 wherein a rotor turning shaft and a lengthwise axis of each bolt are parallel.

3. Device according to claim 1 wherein said rotor is designed in cam form, and has on its outer circumference two of said receiving slots.

4. Device according to claim 1 wherein said rotor is designed as a Maltese cross, and has on its outer circumference four of said receiving slots.

5. Device according to claim 1 wherein said rotor has a cylindrical shape, with four of said receiving slots arranged on its outer circumference.

6. Device according to claim 1 wherein said receiving slots are equally dimensioned.

7. Device according to claim 1 wherein said receiving slots are differently dimensioned.

8. A device for the individual feeding of bolts or the like, arranged sequentially between guide rails, to at least two bolt-welding devices, a rotor positioned at the ends of said guide rails, said rotor having at least two receiving slots, each for receiving one of the bolts from the ends of said guide rails and for transferring the received bolt to one of the bolt-welding devices, and means for oscillating said rotor to move said receiving slots alternately between positions aligned with said rails and positions aligned with one of said bolt-welding devices.

9. A device according to claim 8 wherein said bolt-welding devices are positioned on a line perpendicular to said guide rails, and said oscillating means oscillates said rotor through 90° arcs.

10. Device for the individual feeding of bolts, or the like, arranged one after another between guide rails, to at least two bolt outlets, blasted with air, leading to at least two bolt-welding devices, with a rotor arranged between said guide rails and the bolt outlets leading to said bolt-welding devices, with at least two receiving slots for receiving one bolt, said rotor being arranged in a housing and connected on the under side with an osciallating drive, said rotor being fastened to the axis of said drive so that said rotor can be repositioned, said rotor having assembly openings for drawing out and turning said rotor.

11. Device according to claim 10 wherein said receiving slots are designed to pass all the way through.

12. Device according to claim 11 wherein a stop is in each of said receiving slots.

13. Device according to claim 10 wherein said housing has, on opposite sides connections for the air, and on the upper side, bolt outlets connected with said connections.

14. Device according to claim 10 wherein a wedge connection is between said rotor turning shaft and an axis of said drive.

15. Device according to claim 10 wherein said assembly openings are each designed as a threaded blind hole.

16. Device according to claim 15 wherein each of said assembly openings is arranged between two of said receiving slots in said rotor.

* * * * *